US008971721B2

(12) United States Patent
Mazzone et al.

(10) Patent No.: US 8,971,721 B2
(45) Date of Patent: Mar. 3, 2015

(54) METHOD AND SYSTEM FOR BIDIRECTIONAL OPTICAL COMMUNICATION

(75) Inventors: Rinaldo Mazzone, Cambiago (IT); Francesco Martini, Alzate Brianza (IT); Mauro Rudi Casanova, Carugate (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 429 days.

(21) Appl. No.: 13/320,341

(22) PCT Filed: May 20, 2009

(86) PCT No.: PCT/IB2009/052120
§ 371 (c)(1),
(2), (4) Date: Feb. 1, 2012

(87) PCT Pub. No.: WO2010/133919
PCT Pub. Date: Nov. 25, 2010

(65) Prior Publication Data
US 2012/0128359 A1    May 24, 2012

(51) Int. Cl.
*H04B 10/00* (2013.01)
*H04B 10/516* (2013.01)
(Continued)

(52) U.S. Cl.
CPC .......... *H04B 10/516* (2013.01); *H04B 10/2587* (2013.01); *H04B 10/27* (2013.01);
(Continued)

(58) Field of Classification Search
CPC ............. H04B 10/2503; H04B 10/504; H04B 10/5161; H04B 10/556; H04B 10/66; H04B 10/675
USPC ......... 398/140, 168, 169, 170, 182, 183, 187, 398/199, 202, 212, 213, 214
See application file for complete search history.

(56) References Cited

U.S. PATENT DOCUMENTS

2007/0183788 A1   8/2007 Kim et al.
2008/0279556 A1*  11/2008 Yu et al. ........................ 398/72

(Continued)

FOREIGN PATENT DOCUMENTS

CN   1422465    6/2003
CN   101057425  10/2007

OTHER PUBLICATIONS

Martinez et al., "Novel WDM-PON Architecture Based on a Spectrally Efficient IM-FSK Scheme Using DMLs and RSOAs", Feb. 1, 2008, Journal of Lightwave Technology, vol. 26, No. 3, pp. 350-356.*

(Continued)

*Primary Examiner* — Daniel Dobson
(74) *Attorney, Agent, or Firm* — Baker Botts, LLP

(57) ABSTRACT

A method for bidirectional optical communication comprising the steps of:—at a first optical line terminal, directly modulating a laser source to generate a downstream optical signal which has an optical power spectrum comprising two peaks having a frequency separation and a non zero power difference at generation;—propagating said downstream optical signal at a distance along an optical line comprising at least a first optical fiber propagating said downstream optical signal to a second optical line terminal;—at the second optical line terminal: power splitting said downstream optical signal to generate a first and a second power portion of said downstream optical signal, spatially separated; passive filtering said first power portion of said downstream optical signal so as to increase in absolute value a respective power difference of said two peaks, so as to obtain a filtered optical signal which is thereafter detected; and amplitude modulating the second power portion of the downstream optical signal so as to obtain an upstream optical signal having a second amplitude modulation;—propagating back along said optical line the upstream optical signal to the first optical line terminal;—at said first optical line terminal, detecting said upstream optical signal; wherein the method further comprises the step of passive filtering said downstream optical signal and/or said second power portion of the downstream optical signal and/or said upstream optical signal, so as to lower, in absolute value, a respective non zero power difference of said two peaks.

17 Claims, 12 Drawing Sheets

(51) Int. Cl.
H04B 10/2587 (2013.01)
H04B 10/27 (2013.01)
H04B 10/272 (2013.01)
H04B 10/50 (2013.01)
H04B 10/58 (2013.01)
H04J 14/02 (2006.01)
H04B 10/06 (2006.01)

(52) U.S. Cl.
CPC .......... *H04B 10/272* (2013.01); *H04B 10/504* (2013.01); *H04B 10/58* (2013.01); *H04J 14/0282* (2013.01); *H04J 14/0246* (2013.01); *H04J 14/025* (2013.01)
USPC ............ 398/169; 398/140; 398/212; 398/213

(56) References Cited

U.S. PATENT DOCUMENTS

| | | | | |
|---|---|---|---|---|
| 2009/0274462 | A1* | 11/2009 | Yu | 398/68 |
| 2011/0069964 | A1* | 3/2011 | Yu et al. | 398/130 |
| 2012/0057883 | A1* | 3/2012 | Andre et al. | 398/208 |

OTHER PUBLICATIONS

Deng Ning et al., "Data remodulation on downstream OFSK signal for upstream transmission in WDM passive optical network", Electronics Letters, IEEE Stevenage, GB, vol. 39, No. 24, Nov. 27, 2003, pp. 1741-1743.

Garces I et al., "WDM Ethernet PON based on downstream narrow-FSK modulation", Optical Communications, European Conference on, IEEE, Sep. 24, 2006, pp. 1-2.

Martinez J.J. et al., "Novel WDM-PON Architecture Based on a Spectrally Efficient IM-FSK Scheme Using DMLs and RSOAs", Journal of Lightwave Technology, IEEE Service Center, Feb. 1, 2008, vol. 26, No. 3, pp. 350-356.

Garces I et al., "Analysis of narrow_FSK downstream modulation in colourless WDM PONs", Electronics Letters, IEE Stevenage, GB, Apr. 12, 2007, vol. 43, No. 8, pp. 471-472.

Deng, N et al.,"Experimental investigation of re-modulating upstream OOK data on downstream OFSK signal in a two-way WDM access network", IEEE, Dec. 15, 2003, vol. 1, pp. 149-149.

Arellano C. et al., "Bidirectional single fiber transmission based on a RSOA ONU for FTTH using FSK-IM modulation formats", IEEE, vol. 3, Mar. 6, 2005, pp. 492-494.

Vegas, J.J. et al., "High bit-rate combined FSK/IM modulated optical signal generations by using GCSR tunable laser sources", Optics Express, vol. 11, No. 23, Nov. 17, 2003, pp. 3136-3140.

Chinese Patent Application No. 2009/801606463, Chinese Search Report (English translation not provided) May 27, 2014.

* cited by examiner

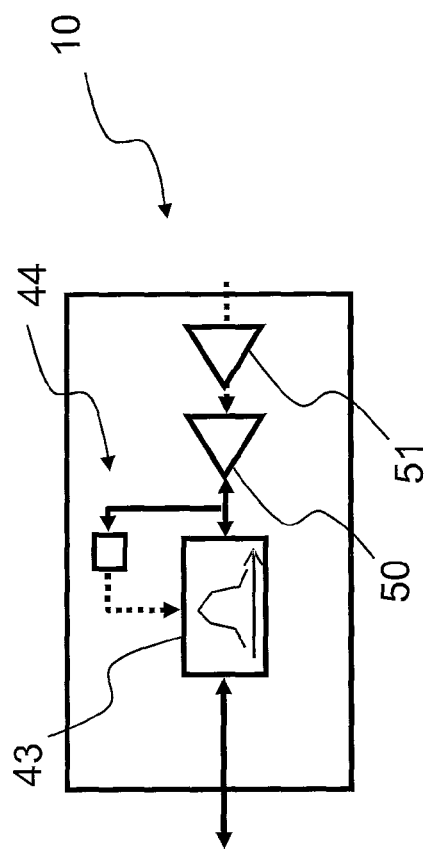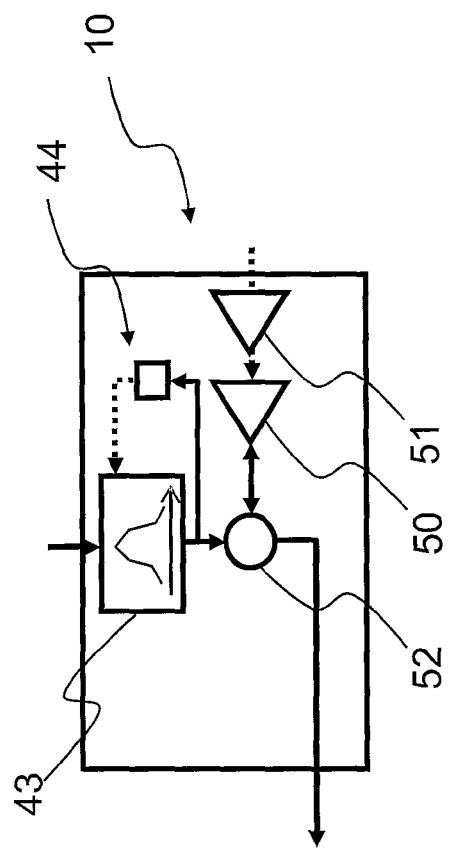

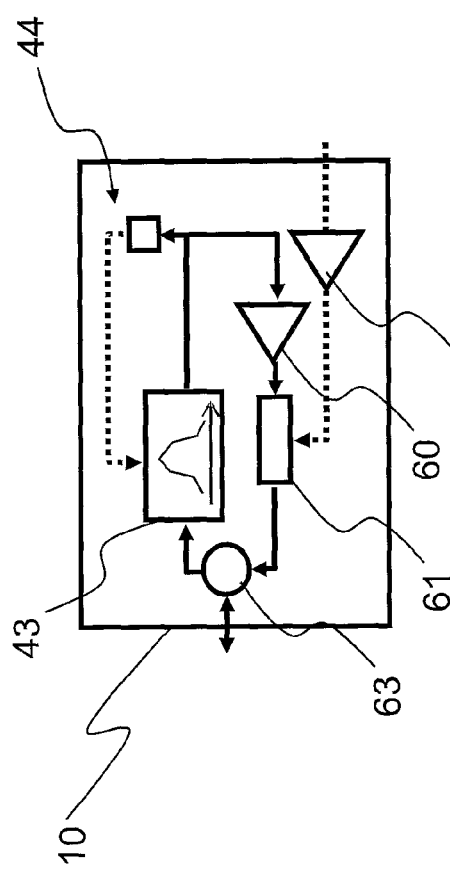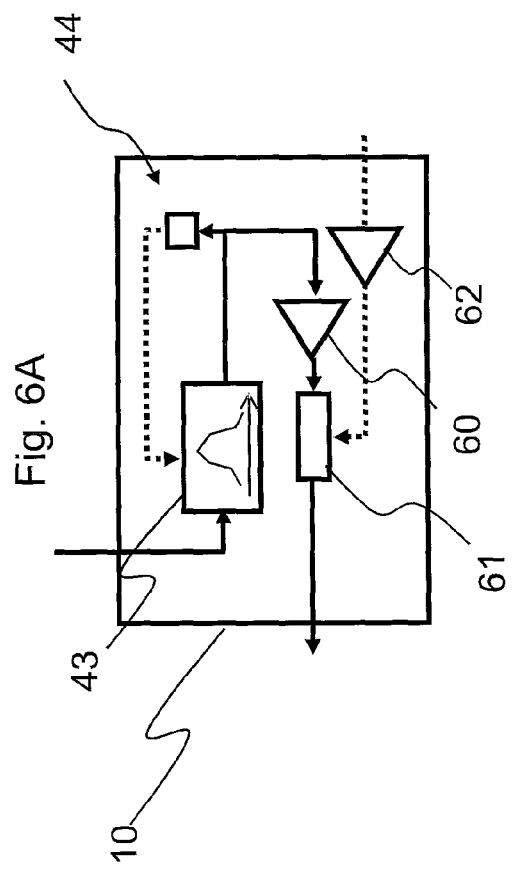

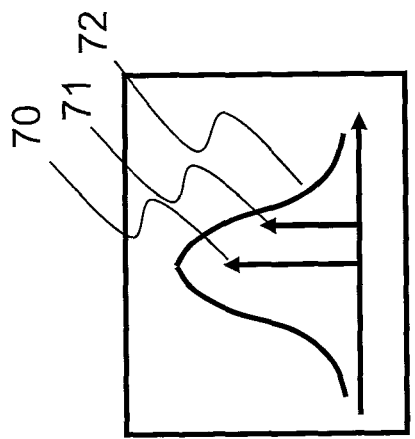
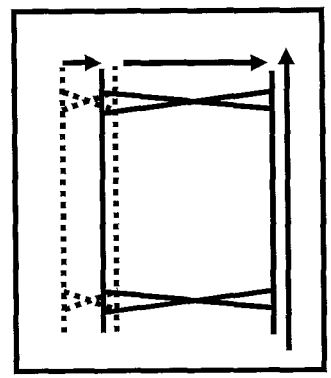
Fig. 7A
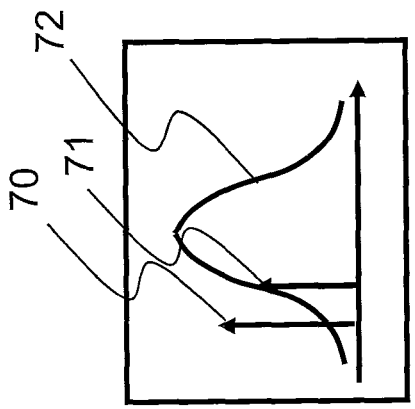
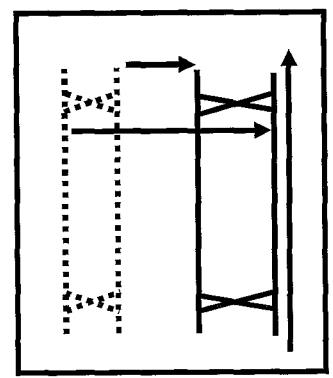
Fig. 7B
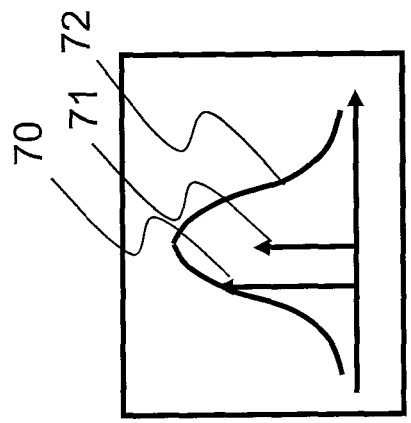
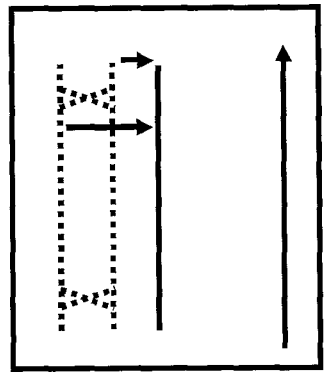
Fig. 7C

METHOD AND SYSTEM FOR BIDIRECTIONAL OPTICAL COMMUNICATION

This application is the U.S. national phase of International Application No. PCT/IB2009/052120 filed 20 May 2009 which designated the U.S., and by which the entire contents of each of which are hereby incorporated by reference.

The present invention relates to the field of optical communication, in particular to the field of fiber-based bidirectional optical communication, exemplarily for distribution or "fiber to the x" (FTTx) applications, wherein "x" stands for, e.g., a curb or cabinet (FTTC), a premises (FTTP) or a home (FTTH).

It is known a wavelength division multiplexing (WDM) optical network (PON) comprising, at a first optical line terminal (usually located in a central office and named accordingly), a set of directly modulated lasers (DMLs, e.g. distributed feed back, or DFB, lasers) each one generating a downstream optical signal having a frequency shift keying (FSK) modulation arising from the modulation of the optical carrier frequency of the laser (adiabatic and transient chirp) caused by the direct modulation of the laser current. Since this frequency excursion is intrinsically related to a difference of the power levels for '1' (or 'marks') and '0' (or 'spaces'), (which is related to the so-called extinction ratio (ER), defined as the ratio of the mean power levels for '1' and '0'), the resulting downstream optical signal is also intensity modulated (IM). A multiplexer spatially combines together the downstream FSK modulated signals, each one having a different central wavelength, and the combined WDM signal is launched into a single optical fiber (typically about 25 km long) at a first end thereof. At a second, opposite end thereof, a demultiplexer (e.g. an arrayed waveguide grating, AWG) spatially separates the various downstream FSK modulated signals, each one of which is thereafter sent to a second optical line terminal (usually located in a user premises or in a cabinet, and called optical network unit—ONU), wherein it is spatially separated by an optical power splitter into two optical signals. The first one is demodulated using an optical power filter (e.g. an athermal Mach-Zehnder differential interferometer, MZDI, or a Fabry-Perot, FP, etalon) which converts the FSK modulation into an amplitude modulation by proper alignment of the optical power spectral response of the filter (e.g. having a free spectral range, FSR, of several GHz) with the optical spectrum of the FSK modulated signal. The filtered signal is then directly detected by a photodetector. Using a reflective semiconductor optical amplifier (RSOA) as an upstream amplifier, the second one of the downstream optical signals is intensity modulated (typically with non return to zero, or NRZ, modulation scheme), amplified and reflected to generate the upstream signal carrying the upstream data. So, the upstream signal is wavelength seeded directly from the central office. The generated upstream signal is then sent back to the second end of the same optical fiber of the downstream signal, via the above optical splitter and the demultiplexer which now operates as a multiplexer of the different upstream signals, and therethrough propagated. At the first optical line terminal or central office, the upstream signals are spatially separated by the same multiplexer above, which now operates as a demultiplexer, and each upstream signal is singly sent, via a circulator, to a photodetector for direct detection.

The Applicant has found that, while it is generally recognized in the art that it is preferable to set low the intensity modulation (IM), or the ER, of the downstream optical signal at generation in order to reduce the residual IM of the downstream signal into the upstream signal, however an ER of the downstream optical signal as upstream seed above zero is considered acceptable and/or unavoidable when using FSK downstream modulation by directly modulated lasers (DMLs), due to the intrinsic relationship among the carrier frequency modulation of the laser and the intensity modulation. Therefore, an ER of the downstream signal as upstream seed of about 2 dB or above is generally tolerated in the art.

It is also known a technique aimed at reducing the residual IM of the downstream signal into the upstream signal by using an upstream amplifier at or close to saturation, which, when increasing the optical power of the downstream optical signal as upstream seed, reduces the above difference of the power levels for marks and spaces. However, the Applicant notes that operating the amplifier at saturation has some drawbacks and/or that this technique, while being able to reduce the above difference of the power levels for marks and spaces, it is not typically able to substantially cancel the above difference.

It is also known a single fiber optical communication system, wavelength seeded from the central office, wherein a pure FSK modulation is imposed onto the downstream signal, characterized by zero or substantially zero IM.

The Applicant considers that the latter solution, while solving the problem of eliminating or substantially reducing the residual IM of the downstream signal into the upstream signal, however it is not practicable since its modulation scheme and the components used to achieve it (such as e.g. the source based on a Grating-assisted Codirectional-coupler with rear-Sampled Reflector) are complex and costly.

The Applicant has also found that the prior art bidirectional optical communication systems and methods based on a single fiber suffers the problem of back-reflections and/or Rayleigh backscattering, which may impair the overall transmission quality, in particular as regard the interference of the back reflected or scattered downstream optical signal to the upstream optical signal.

In this context, the technical aim of the present invention is to provide a bidirectional optical communication method and system which are apt to overcome, among others, one or more of the above disadvantages of the art.

One of the purposes of the present invention in one or more of its different aspects is providing an optical communication method and a related system wherein the upstream signal, at least at detection, has a negligible or at least reduced impairment due to the residual IM modulation of the downstream signal.

One of the purposes of the present invention in one or more of its different aspects is providing an optical communication method and a related system wherein the upstream signal has a negligible or at least reduced impairment due to the back reflection of the downstream signal, and/or vice versa.

One of the purposes of the present invention in one or more of its different aspects is providing an optical communication method and a related system which is economically feasible.

One of the purposes of the present invention in one or more of its different aspects is providing an optical communication method and a related system which is simple and/or low cost in the design and/or the manufacture and/or the deployment and/or the operations and/or the maintenance.

One or more of the above technical task and/or the above purposes may be substantially achieved by an optical communication method, and the related system, comprising the technical features of one or more of the attached claims (each one considered alone, neglecting its possible dependency, or variously combined) and/or of the following aspects, variously combined mutually and/or with the attached claims.

In an aspect the invention relates to a method for bidirectional optical communication comprising the steps of:—at a first optical line terminal, directly modulating a laser source to generate a downstream optical signal which has an optical power spectrum comprising two peaks having a frequency separation and a non zero power difference at generation;—propagating said downstream optical signal at a distance along an optical line comprising at least a first optical fiber propagating said downstream optical signal to a second optical line terminal;—at the second optical line terminal: power splitting said downstream optical signal to generate a first and a second power portion of said downstream optical signal, spatially separated; passive filtering said first power portion of said downstream optical signal so as to increase in absolute value a respective power difference of said two peaks, so as to obtain a filtered optical signal which is thereafter detected; and amplitude modulating the second power portion of the downstream optical signal so as to obtain an upstream optical signal having an amplitude modulation;—propagating back along said optical line the upstream optical signal to the first optical line terminal;—at said first optical line terminal, detecting said upstream optical signal; wherein the method further comprises the step of passive filtering said downstream optical signal and/or said second power portion of the downstream optical signal and/or said upstream optical signal, so as to substantially lower, in absolute value, a respective non zero power difference of said two peaks.

The Applicant believes that the above additional step of passive filtering said downstream optical signal and/or said second power portion of the downstream optical signal and/or said upstream optical signal so as to lower, in absolute value, a respective non zero power difference may advantageously result in a substantial cancellation of the IM of the downstream signal residual into the upstream signal due to a power difference of the two above peaks, in any case before the upstream signal is detected. The Applicant also notes that, to his knowledge, it is realized for the first time that it is possible and convenient to substantially reduce the residual IM into the upstream signal originating from the above non zero power difference of the downstream signal generated by DML, by way of directly passive filtering, after generation of the downstream signal, at least one optical signal among the downstream optical signal, the second power portion of the downstream optical signal and the upstream optical signal.

In practice, the measured optical power spectrum of an optical signal depends on the resolution of the measurement instrument. In general, the measured optical power spectrum is, at each wavelength, the integral of the optical power density spectrum over a wavelength band centred at that wavelength and having a given bandwidth, which is equal to the above resolution. For the purpose of the present invention, a suitable resolution is the resolution which is sufficiently narrow to be able to resolve the above two peaks and sufficiently high to be able to integrate each single peak. Exemplarily, a suitable resolution is between 5 pm and 20 pm, typically equal to about 10 pm.

With the expression 'passive filtering' it is meant the processing of an optical signal wherein the non zero portion of its optical power spectrum (which typically comprises the above two peaks) is varied differently along the frequency spectrum, the variation nowhere consisting in an increase of the optical power (and therefore the variation being either a reduction or a preservation of the optical power). When the passive filtering is performed by a filter, the latter has a power response which is frequency dependent at least in correspondence of the non zero portion of the optical power spectrum of the optical signal, and in addition the filter is a passive filter, i.e. it lacks any means for increasing the optical power of the signal, such as an optical amplifying means.

It is understood that, depending on the various practical realizations of the present invention, one or more of the downstream optical signal, the first and the second power portion of the downstream optical signal and the upstream optical signal exhibits the two above peaks having the same spectral position occupied initially in the power spectrum of the downstream optical signal at generation. However, the respective non zero power difference of the two peaks in the optical signal to be passive filtered, in accordance to the present invention, so as to substantially lower it in absolute value, may be different from the above initial non zero power difference (at generation).

In an aspect, in the step of passive filtering said downstream optical signal and/or said second power portion of the downstream optical signal and/or said upstream optical signal, the respective non zero power difference of the two peaks is at least halved altogether.

In an aspect, in the step of passive filtering said downstream optical signal and/or said second power portion of the downstream optical signal and/or said upstream optical signal, so as to substantially lower, in absolute value, a respective non zero power difference of said two peaks, the latter is lowered at a value smaller than said non zero power difference at generation.

In an aspect, in the step of passive filtering said downstream optical signal and/or said second power portion of the downstream optical signal and/or said upstream optical signal, the respective power difference of the two peaks is substantially cancelled, before detecting the upstream optical signal.

In an aspect, the downstream optical signal has, at generation, a frequency modulation and a first amplitude (or intensity) modulation having a first non zero extinction ratio (ER) related to said non zero power difference of the above two peaks. Conventionally, the above (different) amplitude modulation of the upstream optical signal is called 'second amplitude modulation'.

In practice, the measure of the power difference of the two peaks in the optical power spectrum of an optical signal, results in the measure of the related extinction ratio, at least for a suitable selection of the resolution described above. See above for suitable values of the resolution.

Typically, the power difference of the two peaks (or the ER) is expressed in a logarithmic base (dB), as the logarithm of the ratio of the two power values. Typically, the peak centred at a lower wavelength is higher than that centred at the higher wavelength. Conventionally, however, in the present description and claims the above non zero power difference of the downstream optical signal at generation is always taken positive.

In an aspect, the step of passive filtering so as to lower, in absolute value, a respective non zero power difference lowers said respective non zero power difference (e.g. the first ER) at an absolute value equal to or less than 0.5 dB, preferably equal to or less than 0.2 dB, more preferably equal to or less than 0.1 dB (i.e. at a substantially zero value).

The above additional step of passive filtering said downstream optical signal and/or said second power portion of the downstream optical signal and/or said upstream optical signal so as to lower, in absolute value, a respective non zero power difference may be performed by passive filtering only one of the three above optical signals (preferred solution), or two (taken in any combination) out of the three above optical signals, or all the three above optical signals.

In an aspect, the step of passive filtering so as to lower, in absolute value, a respective non zero power difference consists in passive filtering only said downstream optical signal (and not said second power portion of the downstream optical signal nor said upstream optical signal) and is preferably performed before said step of propagating said downstream optical signal at a distance. In this aspect, said respective non zero power difference is said non zero power difference at generation.

In an aspect, the step of passive filtering so as to lower, in absolute value, a respective non zero power difference consists in passive filtering said downstream optical signal and said upstream optical signal (and not said second power portion of the downstream optical signal) and is preferably performed before said step of splitting said downstream optical signal. This aspect may be advantageous in case of a single-fiber optical system (see below).

In an aspect, the step of passive filtering so as to lower, in absolute value, a respective non zero power difference comprises passive filtering at least said second power portion of the downstream optical signal (and not said downstream optical signal) and is performed after said step of splitting said downstream optical signal. In one embodiment of this aspect, the step of passive filtering so as to lower, in absolute value, the respective non zero power difference consists in passive filtering only said second power portion of the downstream optical signal (and not said downstream optical signal nor said upstream optical signal) and is preferably performed before said step of amplitude modulating the second power portion of the downstream optical signal. In another embodiment of this aspect, the step of passive filtering so as to lower, in absolute value, a respective non zero power difference comprises passive filtering said second power portion of the downstream optical signal and said upstream optical signal (and not said downstream optical signal). In this way it is possible to substantially cancel a residual power difference of the two above peaks by way of passive filtering directly the upstream signal.

In an aspect, the step of passive filtering so as to lower, in absolute value, a respective non zero power difference consists in passive filtering only said upstream optical signal (and not said second power portion of the downstream optical signal nor said downstream optical signal) and is preferably performed after said step of propagating back said upstream optical signal.

In an aspect, the step of passive filtering so as to lower, in absolute value, a respective non zero power difference and/or the step of passive filtering said first power portion of said downstream optical signal so as to increase in absolute value the respective power difference is performed via a respective passive optical filter having a non-flat power spectral response, preferably a periodic power spectral response having a FSR. Preferably, a frequency spacing of a WDM optical signal (e.g., see below) is a multiple of the FSR of the spectral response.

Exemplarily, said passive optical filter is a Mach-Zehnder interferometer or a Fabry-Perot etalon or an AWG.

Preferably the power spectral response of the filter may be tuned over wavelength, e.g. by controlling a physical parameter of the optical filter such as the temperature (e.g. by way of a heater or a cooler, such as a Peltier cell).

One or both of the above steps of passive filtering advantageously comprises controlling the mutual position of the power spectral response of the respective filter and of a non-zero portion of the optical power spectrum of the respective optical signal under filtering. The non-zero portion of the optical spectrum (i.e. a portion of the optical power spectrum having non-zero or not negligible optical power) typically comprises the above two peaks.

In the step of passive filtering so as to lower, in absolute value, a respective non zero power difference, the above non-zero portion of the optical spectrum (or the above two peaks) of the relevant optical signal is aligned, in a preferred embodiment, with a portion of the filter power spectral response having positive slope, when considering the spectra versus wavelength. Preferably, the slope in said portion, when considering the spectra versus frequency, is, in absolute value, greater than or equal to about 0.1 dB/GHz and/or less than or equal to about 2 dB/GHz, preferably greater than or equal to about 0.2 dB/GHz and/or less than or equal to about 0.5 dB/GHz.

In the step of passive filtering said first power portion of said downstream optical signal so as to increase in absolute value the respective power difference (which may have a non-zero or a substantially zero value), the above non-zero portion of the optical spectrum of the (first portion of the) downstream optical signal is aligned, in a preferred embodiment, with a portion of the filter power spectral response having negative slope and, in another embodiment, with a portion of the power spectral response having positive slope.

In an aspect, the step of passive filtering said first power portion of said downstream optical signal so as to increase in absolute value a respective power difference of said two peaks, increases the latter at a value greater than said non zero power difference at generation.

In an aspect, in the step of passive filtering said first power portion of said downstream optical signal so as to increase in absolute value the respective power difference, the frequency modulation of the downstream optical signal is converted in a further amplitude modulation corresponding to the first amplitude modulation but having a respective extinction ratio higher than said first extinction ratio of said first amplitude modulation.

In an aspect, in the step of directly modulating a laser source, a laser, preferably a DFB laser, is biased, e.g. by a current source, at high bias current (e.g. between about 60 mA and about 100 mA) and modulated, e.g. by a laser driver, with a (relatively low) modulation current (e.g. between about 20 mA and about 60 mA peak to peak).

In an aspect, the above frequency separation of the two peaks (e.g. of the downstream optical signal power spectrum) is between about 2 GHz and about 20 GHz, preferably between about 3 GHz and about 8 GHz.

In an aspect, said first extinction ratio at generation is between about 1 dB and about 4 dB, typically between about 2 dB and about 3 dB.

In an aspect, the step of passive filtering so as to lower, in absolute value, a respective non zero power difference comprises controlling the mutual position of the power spectral response of the respective passive optical filter and of the non-zero portion of the optical spectrum of the respective optical signal under filtering, preferably by tapping a power portion of the respective optical signal, preferably after being filtered, in order to generate a monitor optical signal and controlling said mutual position in function of said monitor optical signal, e.g. so as to keep an amplitude modulation of the monitor optical signal (typically related to said first amplitude modulation) at a substantially zero level. Preferably the monitor optical signal is detected in order to generate a corresponding electrical monitor signal, then an AC component of the electrical monitor signal is isolated (e.g. by a capacitor) and said AC component is then processed, digitally or analogically, e.g. by way of a control circuit based on a PID, in order to generate a feedback signal depending upon said AC component. Preferably, such feedback signal is generated in order to minimize said AC component (e.g. so as at keep it a substantially zero level). Preferably, the feedback signal is fed to the laser source and/or to the optical filter in order to control a respective physical parameter, such as the temperature of the laser or of the filter.

In an aspect, said filtered optical signal and/or said upstream optical signal is directly detected by a direct detection receiver comprising, e.g., a photodiode (PD), such as a PIN photodiode or an avalanche PD (APD), possibly followed by a transimpedance amplifier and a clock and data recovery (CDR).

In an aspect, the step of amplitude modulating the second power portion of the downstream optical signal comprises the step of optically amplifying said second power portion, e.g. by an optical amplifier such as a semiconductor optical amplifier (SOA or RSOA) or an erbium-doped amplifier. In one embodiment, the amplifier is a pass-through amplifier, such as a SOA. In another embodiment, the amplifier is a reflective amplifier, such as a RSOA, which amplifies in a double pass.

The step of amplitude modulating may comprise amplitude modulating the optical signal by way of an external modulator, such as a MZI modulator, placed typically downstream the amplifier with respect to the direction of propagation of the optical signal to be modulated, or by direct current modulation of the amplifier itself (especially advantageous in case of a RSOA).

In an aspect, in the step of propagating back along said optical line the upstream optical signal, the latter is propagated into said first optical fiber.

In an aspect, in the step of propagating back along said optical line the upstream optical signal, the latter is propagated into a second, distinct, optical fiber comprised in said optical line.

In an aspect, the method in any of the above aspects is a method for WDM bidirectional optical communication comprising the steps of: at the first optical line terminal, directly modulating a plurality of laser sources, including said laser source above, each emitting at a different optical wavelength, to generate a plurality of downstream optical signals, including said downstream optical signal above, each having the same characteristics of the above downstream optical signal in any of the above aspects;

spatially combining said plurality of downstream optical signals into a WDM downstream optical signal and propagating said WDM downstream optical signal at a distance along said first optical fiber of the optical line to the second optical line terminal;

at the second optical line terminal: spatially separating said plurality of downstream optical signals from said WDM downstream optical signal and processing each downstream optical signal in the same way as the said downstream optical signal in any of the above aspects, and obtaining a plurality of upstream optical signals, including said upstream optical signal above, each one having the same characteristics of the above upstream optical signal in any of the above aspects; and spatially combining said plurality of upstream optical signals into a WDM upstream optical signal;

propagating back along said optical line the WDM upstream optical signal;

at said first optical line terminal, spatially separating said plurality of upstream optical signals from said WDM upstream optical signal and detecting each upstream optical signal.

In an aspect, the step of passive filtering so as to lower, in absolute value, said non zero power difference is performed while spatially combining said plurality of downstream optical signals and/or while spatially separating said plurality of upstream optical signals.

In a further aspect, the present invention relates to a bidirectional optical communication system comprising a first and a second optical line terminal at a mutual distance therebetween and an optical line comprising at least a first optical fiber optically connecting the first and second optical line terminal.

In its various aspects, the above system is configured and/or programmed for performing the method of bidirectional optical communication of any of the above aspects and/or any of the attached claims.

Further characteristics and advantages of the present invention will become clear from the following description of several exemplary embodiments thereof, including a preferred embodiment, having only illustrative purposes and therefore non limitative, with the assistance of the attached drawings, wherein:

FIGS. 5A and 5B and 6A and 6B are schematic block diagrams of four possible embodiments of the upstream transmitter of the optical system of the present invention;

Figure 11B:
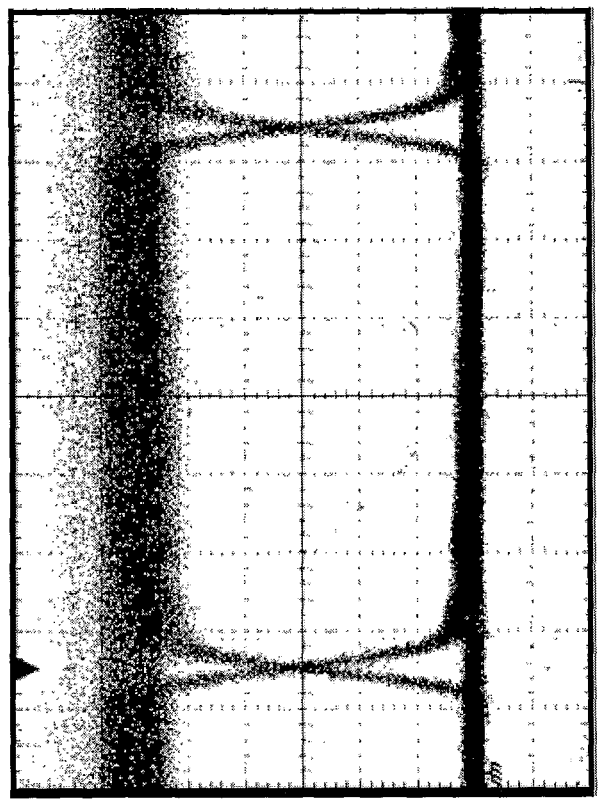
Figure 11A:
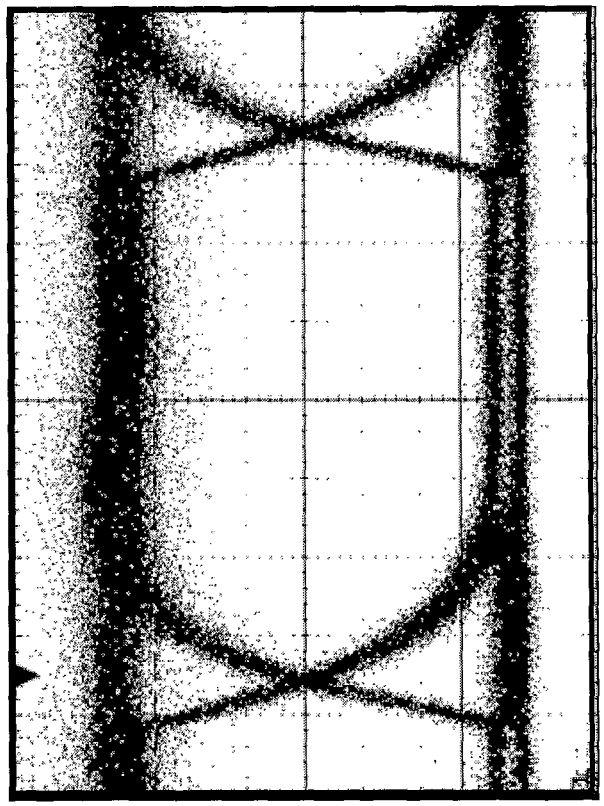

FIGS. 7A-C schematically show the working principle of several different optical filters;

FIGS. 8A and 8B, 9A and 9B, 10A and 10B show the eye diagram (A) and the spectrum (B) of exemplary optical signals during different steps of an aspect of the present invention;

FIGS. 11A and 11B show respectively the eye diagrams of exemplary upstream optical signals corresponding to two different embodiments of the present invention.

With reference to the accompanying figures, the reference number 1 refers to a bidirectional optical communication system in accordance to the present invention in its different embodiments. In the figures, same numerals refer to same elements, possibly in their various embodiments.

The optical system 1 comprises a first 2 and a second optical line terminal 3 and an optical line 4 comprising at least a first optical fiber 5 (typically a single mode optical fiber) optically linking the first and second optical line terminal 2, 3. Typically, the optical fiber has an average length from about 1 km to about 50 km, e.g. from about 3 km to about 40 km. In the drawings, the optical links are schematically indicated by continuous lines having one or two arrowed ends indicating the desired direction(s) of propagation of the optical signals propagating therethrough during operation of the system 1.

Typically, the first optical line terminal 2 is located at a central office of a telecom network. Typically, the second optical line terminal 3 (called in this case optical network terminal) is located at a peripheral end of a telecom network, such as a user home or a premises or a cabinet at a curb (not shown). In this case the system 1 is advantageously applied to access or distribution networks.

The first optical line terminal 2 advantageously comprises a downstream transmitter 6 and an upstream receiver 7, both optically linked to the optical line 4 at a first end 8 thereof.

The second optical line terminal 3 advantageously comprises a downstream receiver 9 and an upstream transmitter 10, both optically linked to the optical line 4 at a second end 11 thereof. An optical power splitter 12 (e.g. a 50/50 splitter, or any other splitting ratio), typically comprised in the second line terminal 3, is optically linked, at an optical port, to the first optical fiber 5 at the second end 11 of the optical line 4 and, at two further optical ports, respectively to the downstream receiver 9 and the upstream transmitter 10.

Figure 1:
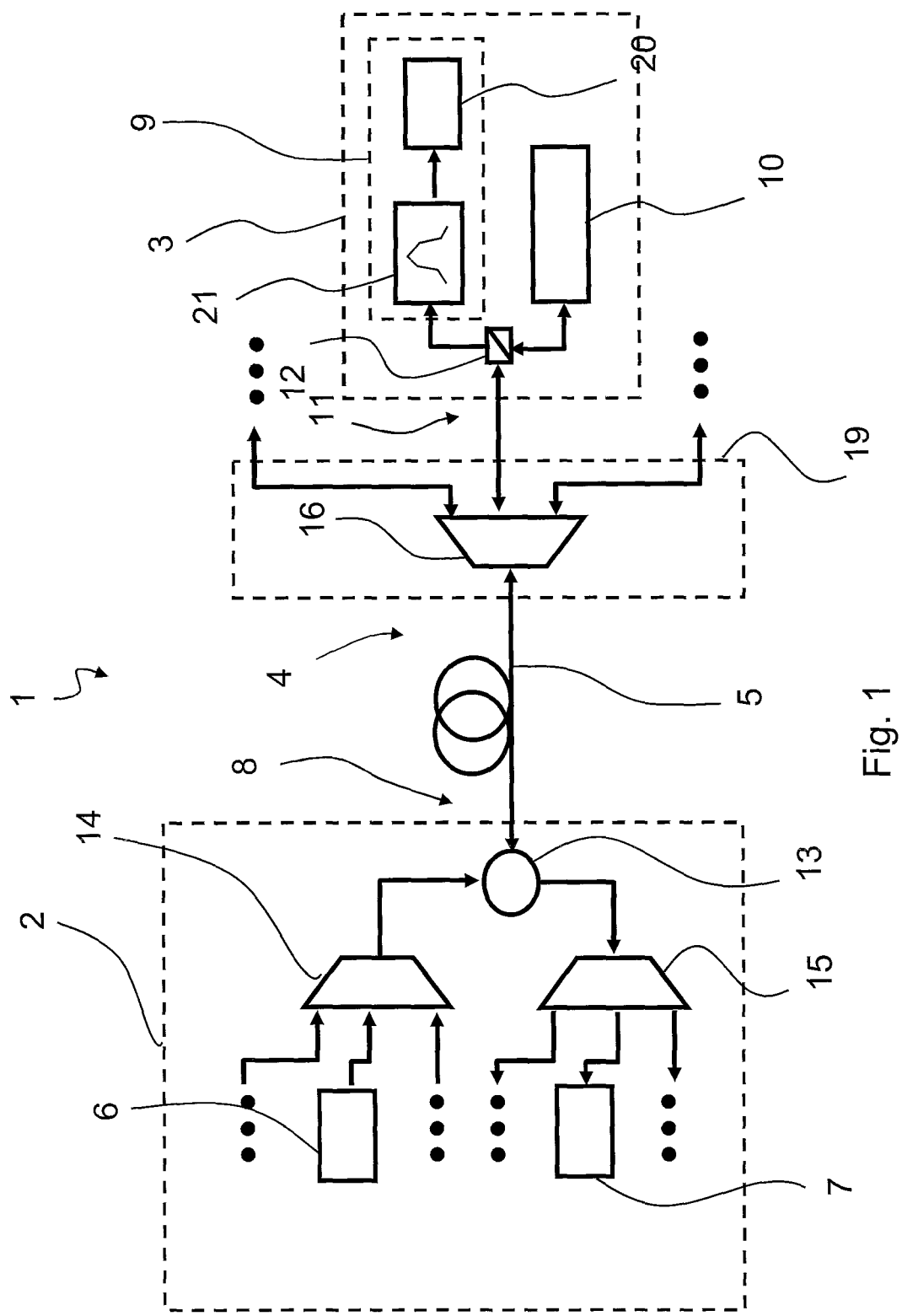
FIG. 1 is a schematic block diagram of a general scheme of the optical system in accordance with an embodiment of the present invention.
Figure 2:
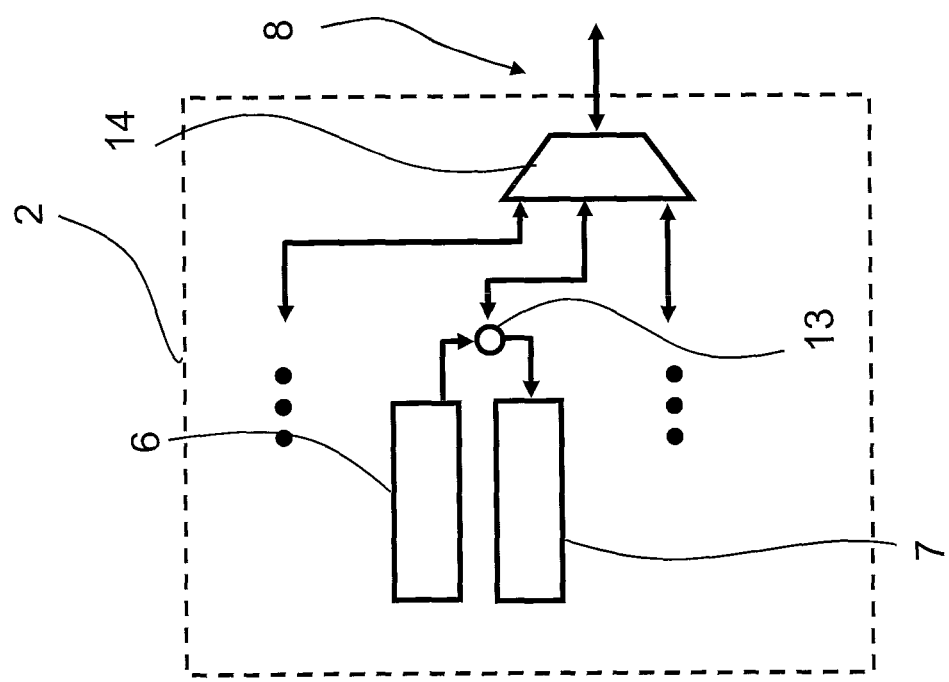
FIG. 2 is a schematic block diagram of a variant of the first optical line terminal of FIG. 1.

FIGS. 1 and 2 show an exemplary optical system 1 wherein the optical line 4 has a single optical fiber 5 for the desired propagation of both upstream and downstream optical signals, as indicated by the two arrowed heads of the link. In this case the system 1 may advantageously comprise an optical circulator 13, typically comprised in the line terminal 2, having a first optical port optically linked to the downstream transmitter 6, a second optical port optically linked to the first end 8 of the optical line 4 (e.g. of the fiber 5) and a third optical port optically linked to the upstream receiver 7. The circulator is any device apt to send an optical light incident in an optical port to the successive port.

Figure 3:
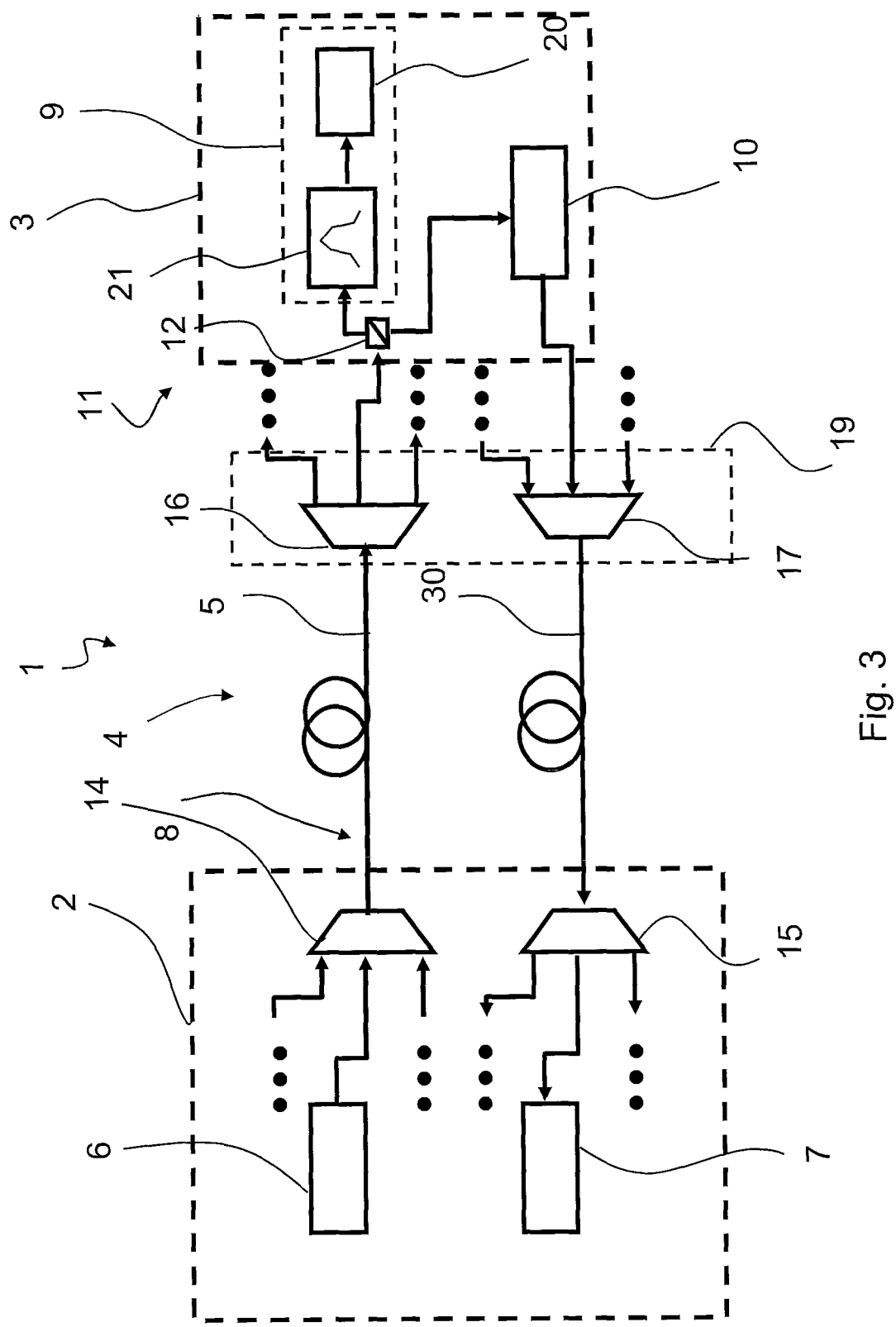
FIG. 3 is a schematic block diagram of a general scheme of the optical system in accordance with a further embodiment of the present invention.

FIG. 3 shows an exemplary optical system 1 wherein the optical line 4 has a first 5 and second optical fiber 30 respectively dedicated for the desired propagation of the upstream and downstream optical signals. In this case there is typically no need for the above circulator 13, being the downstream transmitter 6 linked to the first optical fiber 5, at the first end 8, and the upstream receiver 7 linked to the second optical fiber 30, at the first end 8. Correspondingly, in the second optical line terminal 3 the upstream transmitter 10 is also linked to the second optical fiber 30, at the second end 11 of the optical line 4.

FIGS. 1 to 3 exemplarily show a WDM bidirectional optical communication system 1, wherein the first optical line terminal 2 may advantageously comprise a plurality of downstream transmitters 6, typically mutually similar or identical in the structure and/or in the working principle, and a plurality of upstream receivers 7, typically mutually similar or identical in the structure and/or in the working principle. Preferably, the number of upstream receivers 7 is equal to the number of downstream transmitters 6. The main difference among the various downstream transmitters 6 is that in operation they emit a downstream optical signal having an optical carrier centred on a different optical frequency (or wavelength), the spacing among two consecutive frequencies (called frequency spacing) being typically fixed (e.g. 33 GHz or 50 GHz or 100 GHz or 200 GHz). The number of WDM wavelengths, typically a power of 2, may be comprised between 2 and 128, typically is equal to 32 or 64. Typically, the various WDM wavelengths lie on an ITUT grid.

The system 1 preferably comprises a plurality of second optical line terminals 3, typically mutually similar or identical in the structure and/or in the working principle. Preferably, the number of second optical line terminals 3 is equal to the number of downstream transmitters 6 and/or upstream receivers 7. The various upstream and downstream receivers receive, in operation, a respective optical signals having a different optical carrier wavelength. In the drawings, a symbol consisting in three dots in a horizontal row indicates the possible presence of a certain number (including zero) of further downstream transmitters 6 and/or upstream receivers 7 and/or second optical line terminals 3 in addition to the one respectively shown.

The WDM system 1 may advantageously comprise, typically within the first line terminal 2, a multiplexer 14, such as an AWG, having a plurality of optical ports linked to the plurality of downstream transmitters 6 to receive the respective downstream optical signal and a further optical port linked, at the first end 8 thereof, to the optical line 4 (e.g. to the first optical fiber 5). The WDM system 1 may advantageously comprise, typically within the first line terminal 2, a demultiplexer 15, such as an AWG, having a plurality of optical ports linked to the plurality of upstream transmitters 7 to send the respective upstream optical signal and a further optical port linked, at the first end 8 thereof, to the optical line 4 (e.g. either to the first optical fiber 5, as in FIGS. 1 and 2, or to the second optical fiber 30, as in FIG. 3).

In one embodiment, exemplarily shown in FIGS. 1 and 3, the multiplexer 14 and demultiplexer 15 are two distinct devices. In case of a single optical fiber 5, as exemplarily shown in FIG. 1, the further optical port of the multiplexer 14 may be linked to the first port of the above circulator 13 and the further optical port of the demultiplexer 15 may be linked to the third port of the above circulator 13 (advantageously the first line terminal comprises one and no more than one circulator 13).

In another embodiment, exemplarily shown in FIG. 2, the multiplexer and demultiplexer are the same optical device or, in other words, a single multi-demultiplexer 14 is present which actually acts, in operation, both as a multiplexer and as a demultiplexer. In this case, the system 1 may comprise, typically within the first line terminal 2, a plurality of circulators 13, each having a first optical port optically linked to a respective downstream transmitter 6, a second optical port optically linked to a respective optical port of the above plurality of ports of the multi-demultiplexer 14, and a third optical port optically linked to a respective upstream receiver 7. The number of circulators is preferably equal to the number of downstream transmitters 6.

The WDM system 1 preferably comprises, typically at a remote node 19 (e.g. at a cabinet), a demultipexer 16, e.g. an AWG, having a plurality of optical ports linked to the plurality of second optical line terminals 3 to send the respective downstream optical signal and a further optical port linked to the first optical fiber 5 of the optical line 4. The WDM system 1 may advantageously comprise, typically within the remote node 19, a multiplexer 17, such as an AWG, having a plurality of optical ports linked to the plurality of upstream transmitters 10 (e.g. to the respective output port of the plurality of transmitters 10) to receive the respective upstream optical signal and a further optical port linked to the optical line 4. In one embodiment, exemplarily shown in FIG. 3, the demultiplexer 16 and multiplexer 17 are two distinct devices and the further optical port of the multiplexer 17 is linked to the second optical fiber 30 of the optical line 4. In another embodiment, exemplarily shown in FIG. 1, the multiplexer and demultiplexer are the same optical device or, in other words, a single multi-demultiplexer 16 is present which actually acts, in operation, both as a multiplexer and as a demultiplexer.

Preferably, the downstream receiver(s) 9 and/or the upstream receiver(s) 7 comprises a direct detection (DD) receiver (schematically shown only in the downstream receiver with the numeral 20) comprising a photodiode (PD), such as a PIN or an avalanche PD, possibly followed by a transimpedance amplifier and/or a clock and data recovery (CDR).

Preferably, the downstream receiver(s) 9 comprises, at an upstream position with respect to the DD receiver 20 considering the direction of propagation of the (second power portion of the) downstream signal, a first passive optical filter 21 having a non-flat power spectral response (at least in the non-zero portion of the power spectrum of the signal), preferably a periodic power spectral response having a FSR. Preferably, the frequency spacing of the WDM optical signal is a multiple of the FSR of the spectral response. Exemplarily, said passive optical filter is a Mach-Zehnder interferometer or a Fabry-Perot etalon or an AWG.

Preferably the power spectral response may be tuned over wavelength, e.g. by controlling a physical parameter of the optical filter such as the temperature (e.g. by way of a heater or a cooler, not shown, such as a Peltier cell). A feedback circuit (not shown) may be associated to the first optical filter 21 in order to control the tuning of its spectral response, e.g. in response to a monitor signal derived from the optical link or from the DD receiver 20.

Figure 4:
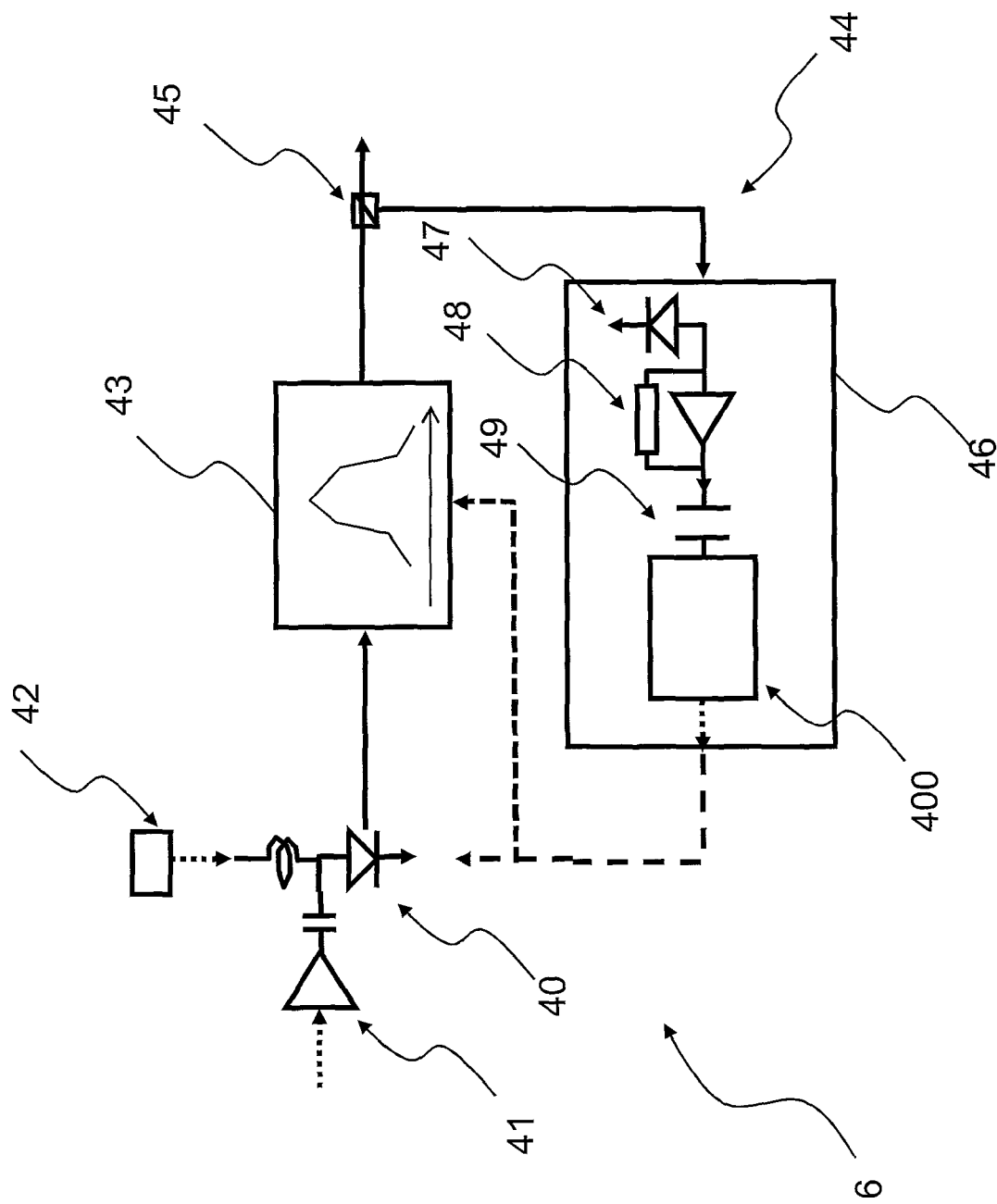
FIG. 4 is a schematic block diagram of an embodiment of the downstream transmitter of the optical system of the present invention.

FIG. 4 shows the downstream transmitter 6 according to an embodiment of the present invention. It comprises a laser source 40, preferably a DFB laser, and a laser driver 41 for driving the laser. The transmitter typically comprises a current source 42 for supplying a bias current to the laser.

The transmitter 6 may comprise, optically linked to the laser and at a downstream position with respect to the laser 40 considering the direction of propagation of the downstream signal, a second passive optical filter 43 having a non-flat power spectral response (at least in the non-zero portion of the power spectrum of the signal under filtering), preferably a periodic power spectral response having a FSR. Preferably, the frequency spacing of the WDM optical signal is a multiple of the FSR of the spectral response. Preferably, the slope in at least a portion (having width of at least 2 GHz or 3 GHz) of its power spectral response versus frequency is negative and, in absolute value, greater than or equal to about 0.1 dB/GHz and/or less than or equal to about 2 dB/GHz, preferably greater than or equal to about 0.2 dB/GHz and/or less than or equal to about 0.5 dB/GHz.

Exemplarily, the second optical filter is a Mach-Zehnder interferometer or a Fabry-Perot etalon or an AWG. The AWG may advantageously be the multiplexer 14 described above. In this case, a single filter may 'equalize' (i.e. cancel or at least substantially lower the respective non zero power difference) all the WDM downstream signals.

Preferably the power spectral response of the second filter may be tuned over wavelength, e.g. by controlling a physical parameter of the optical filter such as the temperature (e.g. by way of a heater or a cooler, not shown, such as a Peltier cell). A feedback circuit 44 may be associated to the second optical filter 43 (and/or to the laser 40) in order to control the tuning of the spectral response of the filter and/or the tuning of the central wavelength emitted by the laser (e.g. by controlling a physical parameter of the laser such as the temperature or the bias current).

Referring to FIG. 4, the feedback circuit 44 may comprise an optical splitter or tap 45 optically linked to the filter 43 for splitting a power portion of the downstream optical signal as a monitor optical signal. The splitter 45 is typically placed along the optical link downstream the second optical filter 43 with respect to the direction of propagation of the downstream signal, for tapping a power portion of the downstream optical signal already filtered. More in general, the splitter 45 is typically placed along the optical link downstream the second optical filter 43 with respect to the direction of propagation of the relevant optical signal to be split or tapped for monitoring (which may also be the upstream signal or the first power portion of the downstream signal, depending on the implementations). The splitter 45 may exemplary be a beam splitter or a directional coupler. In a preferred solution (especially advantageous in case two counter-propagating optical signals pass through the optical filter 43, see below), the splitter 45 is apt to tap only the optical signal propagating in a single selected direction (typically the direction from the filter 43 to the splitter 45). In this way advantageously the splitter 45 in operation taps only the relevant optical signal to be monitored. The feedback circuit 44 may comprise a controller 46 for receiving the monitor optical signal, detecting it for generating a corresponding monitor electrical signal, and generating a feedback signal in response to the monitor signal. The controller 46 is (electrically) connected to the optical filter and/or the laser for sending the feedback signal. The controller 46 may exemplarily comprise a photodetector 47 followed, in the direction of propagation of the electrical monitor signal, by a transimpedance amplifier 48, a capacitor 49 for extracting an AC component of the electrical monitor signal and a control circuit 400 (e.g. based on a PID), digital or analog, programmed for processing said AC component in order to generate the feedback signal depending upon said AC component. Preferably, the feedback signal is generated in order to minimize said AC component (e.g. so as at keep it a substantially zero level).

Figure 4A:
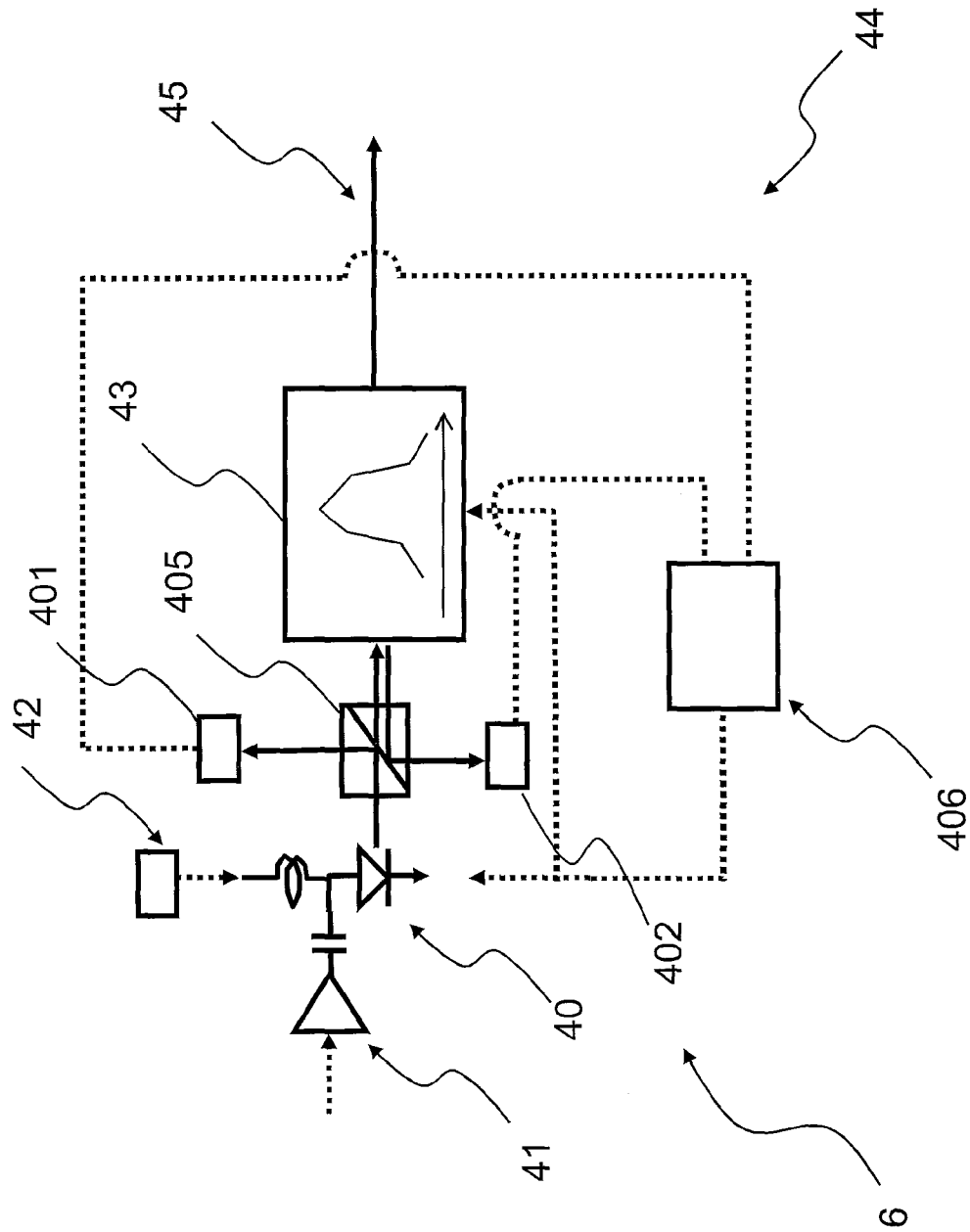
FIG. 4A is a schematic block diagram of a further embodiment of the downstream transmitter of the optical system of the present invention.

FIG. 4A schematically shows an alternative embodiment of the feedback circuit 44 associated to the second optical filter 43 (and/or to the laser 40) in order to control the tuning of the spectral response of the filter and/or the tuning of the central wavelength emitted by the laser. The feedback circuit 44 may comprise an optical beam splitter 405 optically linked to the filter 43. The splitter 405 is typically placed along the optical link upstream the second optical filter 43 with respect to the (desired) direction of propagation of the downstream signal (e.g. from first to second optical line terminal). More in general, the splitter 405 is typically placed along the optical link upstream the second optical filter 43 with respect to the direction of propagation of the relevant optical signal to be split or tapped for monitoring (which may also be the upstream signal or the first power portion of the downstream signal, depending on the implementations—see below). The splitter 405 is apt to tap a power portion of the downstream (or relevant) optical signal before being filtered and in addition to tap a power portion of the downstream (or relevant) optical signal reflected from the optical filter 43, said reflected downstream signal counterpropagating with respect to the downstream optical signal. The feedback circuit 44 may comprise a first 401 and a second 402 optical receiver optically linked to the splitter 405 for receiving the power portion of respectively the downstream (or relevant) optical signal and of the reflected downstream (or relevant) optical signal. The receivers may comprise each a photodetector, typically having bandwidth much narrower than the bandwidth of the data carried by the relevant optical signal. Each receiver is apt to generate a respective electric monitor signal representative of the average power of, respectively, the downstream signal (input to the filter) and the back-reflected downstream signal (or relevant signal). The feedback circuit 44 may comprise a control circuit 406 for receiving the electric monitor signals and generating a feedback signal (or signals) in response to the monitor signals. The control circuit 406 is (electrically) connected to the optical filter and/or the laser for sending the feedback signal.

In operation, the (down-propagating) downstream signal (input to the filter, e.g. with IM modulation) is exemplary split by the splitter 405, a power portion of the signal being directed toward, and received by, the receiver 401, which generates a monitor signal representative of the average power input to the filter 43. The remaining portion of the down-propagating downstream signal is input to the filter 43 that partially reflects it towards the splitter 405, which deviates a power portion of it toward the second receiver 402. The non-reflected, remaining portion of the down-propagating downstream signal passes through the filter and it is then subject to proper filtering. The receiver 402 generates a monitor signal representative of the average optical power reflected by the filter 43. In general, the average optical power reflected by the filter 43 depends, in addition to the average input power (monitored by the first receiver 401), exclusively on the relative position of the non-zero portion of the spectrum of the relevant (e.g. downstream) optical signal with respect to the filter 43 spectral response. For any given relative position (e.g., the 'equalization' condition in accordance to the present invention) it corresponds a well defined value of the ratio between the average optical power input to the filter (monitored by the first receiver 401) and the back-reflected average optical power (monitored by the second receiver 402).

The control circuit 406 keeps constant the above ratio by maintaining constant the ratio between the first receiver 401 and the second receiver 402 currents (e.g. with a feedback algorithm which generates a feedback signal used to control the above physical parameter of the filter 43 and/or the laser 40). In this way the relative position between the non-zero portion of the optical signal spectrum and the filter spectral response is kept constant. In order to determine the target value of the above ratio to be maintained, an initial setting may be done monitoring at the filter output directly the downstream (or relevant) signal (e.g. via eye-diagram monitoring). When the optimal condition is monitored (e.g. on the eye-diagram), the corresponding value of the above ratio is recorded and the feedback (or locking) algorithm may then run in operating conditions in order to keep constant such ratio.

FIGS. 5A and 5B show a respective possible embodiment of the upstream transmitter 10 of the bidirectional optical system 1 respectively based on a single optical fiber 5, as shown in FIG. 1, and on a pair of optical fibers 5, 30, as shown in FIG. 3. The downstream receiver 10 advantageously may comprise a RSOA 50, e.g. as known in the art, or any other reflective optical amplifier, typically driven by a SOA/RSOA driver 51, which has an input for receiving electrical upstream data. The downstream transmitter 10 may advantageously comprise the second optical filter 43 described above, preferably associated to the feedback circuit 44, e.g. of the kind described above, wherein now the monitored signal is the second power portion of the downstream signal. Here, however, the feedback signal is typically sent only to the filter 43 and not to the laser 40.

As regards the embodiment of FIG. 5A, the feedback circuit 44 is typically of the type described with reference to FIG. 4. However, now the control circuit 400 may advantageously be programmed for processing said AC component in order to generate the feedback signal in order to maintain said AC component at a non-zero target value (typically equal to about half of the value of the AC component of the second power portion of the downstream signal if measured before filtering). Advantageously, said AC component, if measured after the relevant signal has passed the filter twice (downstream and upstream), is at a zero value.

As regards the embodiment of FIG. 5B, the feedback circuit 44 is preferably of the type described with reference to FIG. 4, but it may also be of the type described with reference to FIG. 4A (not shown).

The optical filter 43 is typically optically linked to the RSOA upstream thereto, with respect to the direction of propagation of the downstream signal. With reference to FIG. 5A, in case of single-fiber optical system 1 the optical filter 43 (or the RSOA when the filter is not present, see below) may be directly optically linked to the optical splitter 12 of the second line terminal 3. With reference to FIG. 5B, in case of two-fiber optical system 1 the transmitter 10 advantageously comprises an optical circulator 52 having the first port connected to the optical filter 43 (or the optical splitter 12 when the filter is not present, see below), the second port connected to the RSOA and the third port optically linked to the second optical fiber 30. The present invention also contemplates the case (not shown) wherein the optical filter 43 is placed between the second port of the circulator and the RSOA (preferably with a feedback circuit 44 of the type described with reference to FIG. 4) or the case (not shown) wherein the optical filter is placed downstream the third port of the circulator (preferably with a feedback circuit 44 of the type described with reference to FIG. 4A, wherein now the relevant optical signal under monitoring is the upstream signal), or any combination of the above solutions.

FIGS. 6A and 6B show a respective further possible embodiment of the downstream transmitter 10 of the bidirectional optical system 1 respectively based on a single optical fiber 5, of the kind shown in FIG. 1, and on a pair of optical fibers 5, 30, of the kind shown in FIG. 3. The downstream receiver 10 advantageously may comprise a SOA 60, e.g. as known in the art, or any other pass-through optical amplifier, such as a rare-earth amplifier. It may advantageously comprise an external modulator 61 optically connected to the pass-through optical amplifier 60 typically downstream thereto, with respect to the direction of propagation of the upstream optical signal, and is, typically, apt to be driven by a modulator driver 62, which has an input for receiving the electrical upstream data.

In alternative embodiment, not shown, the amplifier 60 may be directly current modulated, without the need of an external modulator.

The downstream transmitter 10 may advantageously comprise the second optical filter 43 described above, preferably associated to the feedback circuit 44, e.g. of the kind described above. The optical filter 43 is preferably optically linked to the amplifier 60 upstream thereto, with respect to the direction of propagation of the (second power portion of the) downstream signal, as exemplarily shown in FIGS. 6A, B. In this case, the feedback circuit 44 is preferably of the type described with reference to FIG. 4, as shown in FIGS. 6A, B, but it may also be of the type described with reference to FIG. 4A (not shown), wherein now the relevant optical signal under monitoring is the second power portion of the downstream signal.

The optical filter 43 may also (not shown) be optically linked to the amplifier 60 downstream thereto, with respect to the direction of propagation of the upstream signal. It may be placed between the amplifier 60 and the modulator 61, and in this case the feedback circuit 44 is preferably of the type described with reference to FIG. 4, but it may also be of the type described with reference to FIG. 4A. The optical filter 43 may be placed downstream the modulator 61 with respect to the direction of propagation of the upstream signal, and in this case the feedback circuit 44 is preferably of the type described with reference to FIG. 4A, wherein now the relevant optical signal under monitoring is the upstream signal.

With reference to FIG. 6B, in case of two-fiber optical system 1 the input of the optical filter 43 (or the optical input of the amplifier 60 when the filter 43 is not present, see below) may be directly optically linked to the optical splitter 12 of the second line terminal 3 and the output of the external modulator 61 directly linked to the second optical fiber 30. With reference to FIG. 6A, in case of single-fiber optical system 1 the transmitter 10 advantageously comprises an optical circulator 63 having the first port connected to the optical splitter 12, the second port connected to the optical filter 43 (or to the input of the amplifier 60 when the filter is not present, see below) and the third port optically linked to the output of the modulator 61. The present invention also contemplates the case (not shown) wherein the optical filter 43 is placed upstream the first port of the circulator with respect to the direction of propagation of the downstream signal (the feedback circuit 44 is preferably of the type described with reference to FIG. 4, wherein the relevant optical signal under monitoring is the downstream signal), or any combination of the above solutions.

In a preferred embodiment, in the optical system 1 a single second optical filter 43 (the 'equalizing filter'), preferably with the feedback circuit 44, is present only at (each) downstream transmitter 6 (when the multiplexer 14 also acts as the filter 43, it is considered comprised within the transmitter 6), and the upstream transmitter 10 and any other part of the system 1 lack of the second optical filter 43. In this case, in operation only the downstream signal is 'equalized' after having been generated. The Applicant has found that this solution is particularly advantageous in that the problems of backreflection and backscattering of the downstream signals which interfere with the upstream signal (in a single fiber system 1) is greatly mitigated, since the downstream signal propagates along the optical line properly equalized.

In an alternative embodiment, in the optical system 1 a single second optical filter 43, preferably with the feedback circuit 44, is present only at (each) upstream transmitter 10 (in its various embodiments shown in FIGS. 5A,B and 6A,B), and the downstream transmitter(s) 6 and any other part of the system 1 lack of the optical filter 43. In this case, in operation only the second power portion of the downstream signal or only the upstream signal is 'equalized'.

In a possible alternative embodiment (not shown), a single second optical filter 43, preferably with the feedback circuit 44, may be present only at (each) upstream receiver 7 (possibly including the demultiplexer 15 or 14), upstream thereto with respect to the direction of propagation of the upstream signal. In this case, in operation only the upstream signal is 'equalized' before being received. The feedback circuit 44 may be of the type described with reference to FIG. 4A, wherein the relevant optical signal under monitoring is the upstream signal.

The present invention also contemplates the case of an optical system 1 wherein the second optical filter 43, preferably with the associated feedback circuit 44, is placed anywhere along the optical link of the system 1, such as along the optical line 4 and/or in the first and/or second optical line terminal and/or remote note 19.

The present invention also contemplates optical systems 1 with more than one second optical filter 43 (for each optical signal within the WDM signal), placed according to any combination of the above embodiments.

In operation, the optical system 1 in its different embodiments implements the method for bidirectional optical communication in accordance with the above various aspects of the present invention.

In the following, reference is done to the exemplary case wherein only the downstream signal is 'equalized' after having been generated (e.g. FIG. 4) and wherein use of an RSOA is done in the upstream transmitter 10 (without the second optical filter 43), in a single fiber 5 bidirectional optical communication system 1 (e.g. FIG. 1)

A DML laser 40 is directly modulated by superimposing to a bias current (from current source 42) a modulating current (from a laser driver 41) corresponding to an electrical downstream data input. The downstream signal thus generated is 'equalized' by the second optical filter 43 (the 'equalizer filter'), which equalizes the power of the two peaks of the optical spectrum of the downstream optical signal. The output of the filter is monitored for locking the filter spectral response to the proper position with respect to the two peaks of the optical signal spectrum. After propagation, a portion of the downstream signal is first filtered (see below and FIGS. 7A, B) and then received. Another portion of the downstream signal acts as an optical upstream seed for the upstream transmitter 10. The optical upstream seed is passed to the RSOA which is directly modulated in current by the driver 51 which receives in input the upstream electrical data signal. The RSOA modulates and amplifies the optical upstream seed, thus generating the optical upstream signal containing the upstream data. After upstream propagation of the upstream signal, the latter is then received by the upstream receiver 7.

FIGS. 7A-C schematically show the working principle of several optical filters. The arrows 70 and 71 in the top diagrams represents schematically the two peaks in the spectrum (e.g. of the downstream optical signal after generation), conventionally (and typically) corresponding respectively to marks (having higher power) and spaces (lower power). In the top diagrams the horizontal axis plots the wavelength and the vertical one the optical power. In the bottom diagrams the horizontal axis plots the time and the vertical one the optical power.

FIG. 7A top and bottom show respectively spectra and eye-diagram in case of an optical filter operated as the first optical filter 21 at the downstream receiver 9. Here, the two peaks are maintained aligned with a portion of the filter power response 72 having negative slope, so as to attenuate spaces much more than marks. Correspondingly, the eye-diagram after filtering (solid line) is much more open than before filtering (dashed line).

FIG. 7B top and bottom show respectively spectra and eye-diagram in case of an optical filter operated as the first optical filter 21 at the downstream receiver 9, in an alternative embodiment. Here, the two peaks are maintained aligned with a portion of the filter power response 72 having positive slope. However, as in the preceding case, the aim of the filter is to open as much as possible the eye, therefore now the marks are much more attenuated than the spaces. Correspondingly, the eye-diagram after filtering (solid line) is more open than before filtering (dashed line).

FIG. 7C top and bottom show respectively spectra and eye-diagram in case of an optical filter operated as the second 'equalizing' optical filter 43, in accordance to the present invention. Here, the two peaks are maintained aligned with a portion of the filter power response 72 having positive slope. However, the aim of the filter 43 is now to 'equalize' the power of marks and spaces. Therefore, now the marks are more attenuated than the spaces, but at an extent calibrated to compensate for the initial power difference. Consequently, contrary to the cases above, the eye-diagram after filtering (solid line, while before filtering is in dashed line) is completely closed. When the first power portion of the equalized downstream signal is received at the downstream receiver 9, then the scheme shown in FIG. 7A or B is still used.

Figure 8B:
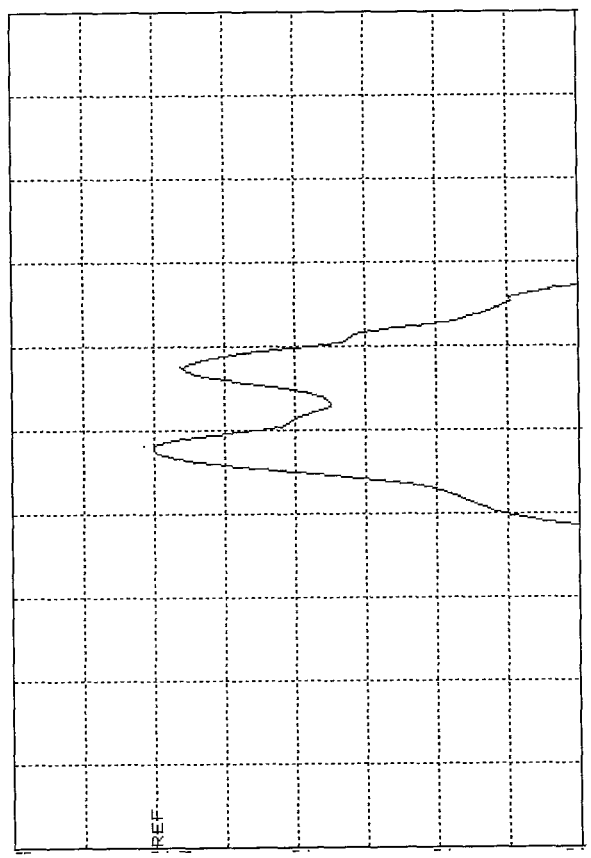
Figure 8A:
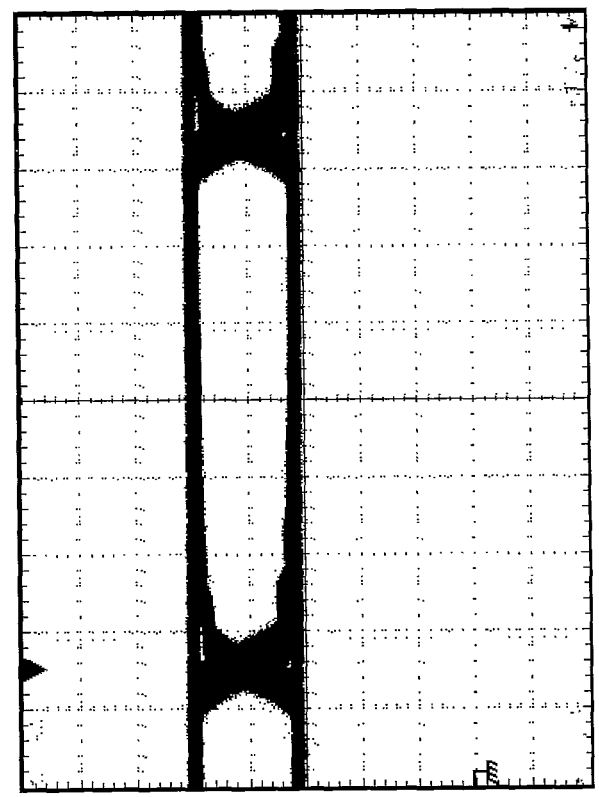

FIGS. 8A and 8B show respectively the measured eye-diagram and optical spectrum of an exemplary downstream optical signal after generation by a commercial DML (bit-rate 1.25 Gb/s, laser bias current 80 mA, laser modulation current 45 mA peak to peak). It is seen that the power difference among the two peaks is about 2 dB. The vertical scale of FIGS. 8A and 9A is 140 µW/div, of FIG. 10A is 13 µW/div.

Figure 9B:
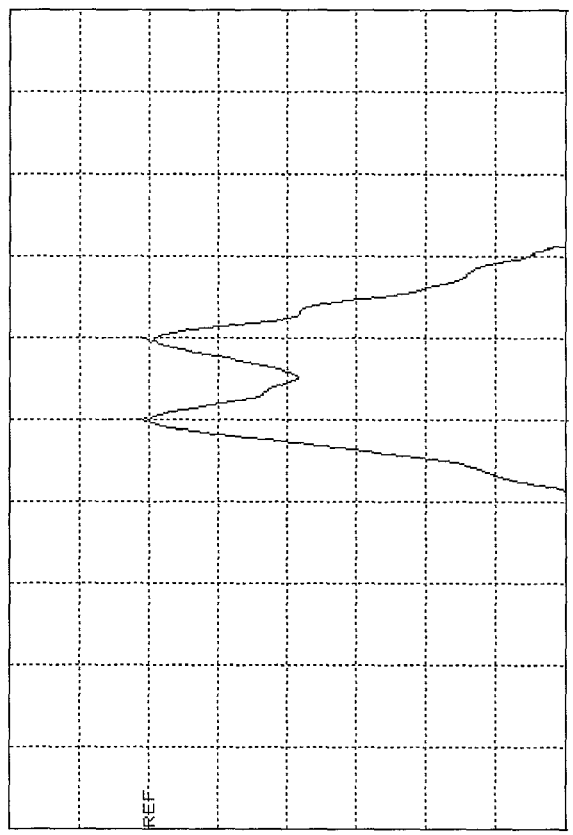
Figure 9A:
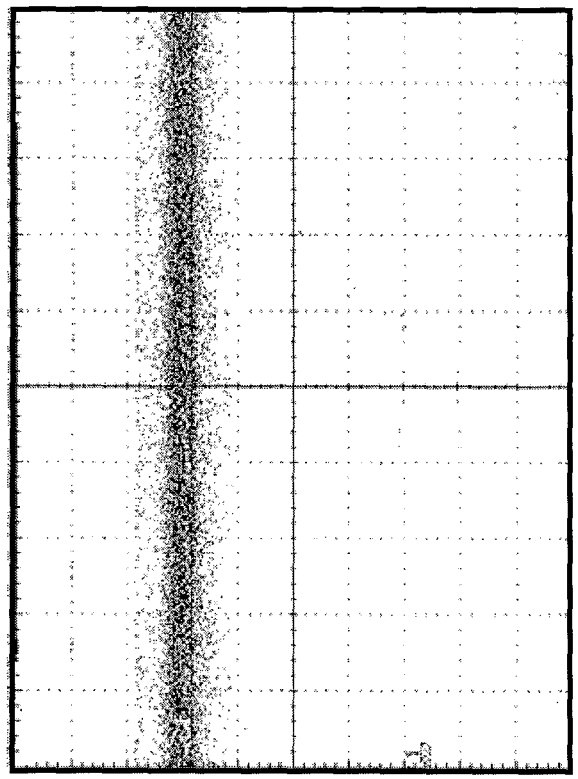
Figure 10B:
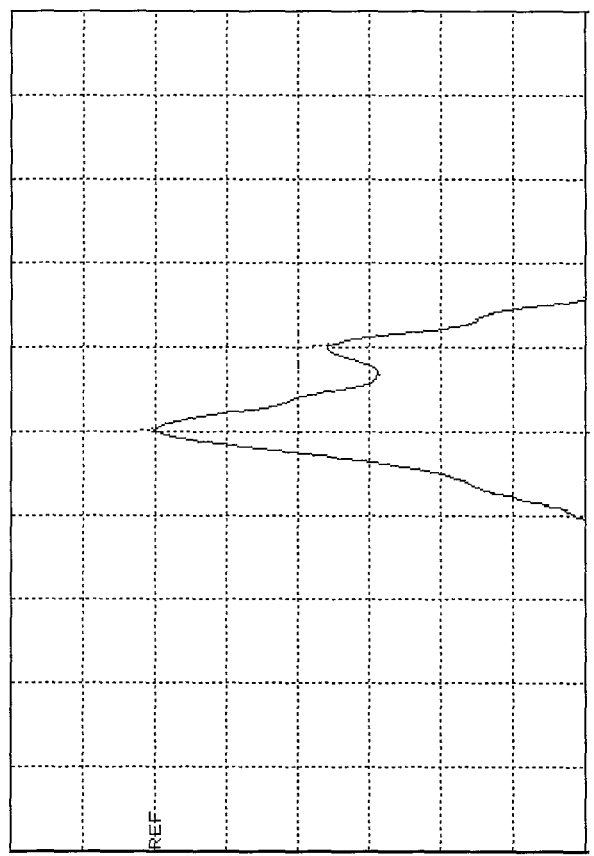
Figure 10A:
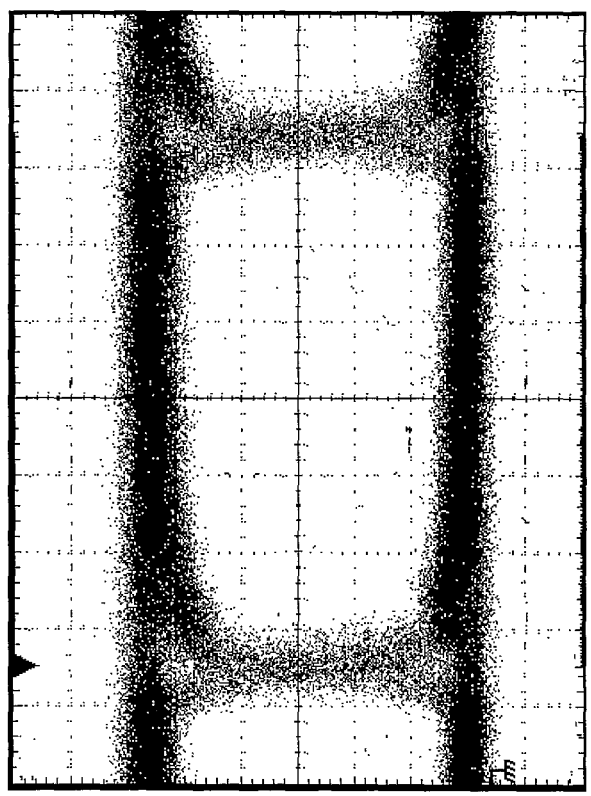

The horizontal scale of FIGS. 8A, 9A and 10A is 115 ps/div. The vertical scale of FIGS. 8B, 9B and 10B is 5 dB/div, the horizontal one is 50 pm/div, the resolution is 10 pm.

FIGS. 9A and 9B show respectively the measured eye-diagram and optical spectrum of the above exemplary downstream optical signal after equalization by an exemplary passive equalizer optical filter 43 (filter type: FP etalon, FSR 50 GHz, bandwidth 6 GHz, slope 0.3 dB/GHz).

FIGS. 10A and 10B show respectively the measured eye-diagram and optical spectrum of the above exemplary equalized downstream optical signal after having been filtered by an exemplary first optical filter 21 (the 'discriminating filter', see FIG. 7A) (filter type: bulk MZ, FSR 25 GHz, bandwidth 6 GHz, slope 0.5 dB/GHz).

FIGS. 11A and 11B show the measured eye-diagram of the upstream signal at the output of, respectively, an exemplary commercial RSOA (Bit-rate 1.25 Gb/s, bias current 25 mA, modulation current 25 mA peak-to-peak, without external modulation) and an exemplary commercial LiNbo$_3$ Mach-Zehnder external modulator (bit-rate 1.25 Gb/s, driving signal amplitude about 6V peak to peak) following a SOA (bias current 200 mA CW), when the above exemplary equalized downstream optical signal acts as optical upstream seed. The vertical scale of FIGS. 11A and 11B is respectively 520 µW/div and 123 µW/div, the horizontal scale is 115 ps/div.

In the figures above the effects of fiber propagation have been neglected (back-to-back experiment).

The invention claimed is:

1. A method for bidirectional optical communication comprising the steps of:
   at a first optical line terminal, directly modulating a laser source to generate a downstream optical signal which has an optical power spectrum comprising two peaks having a frequency separation and a non zero power difference at generation;
   propagating said downstream optical signal at a distance along an optical line comprising at least a first optical fiber propagating said downstream optical signal to a second optical line terminal;
   at the second optical line terminal: power splitting said downstream optical signal to generate a first and a second power portion of said downstream optical signal, spatially separated; passive filtering said first power portion of said downstream optical signal so as to increase in absolute value a respective power difference of said two peaks, so as to obtain a filtered optical signal which is thereafter detected; and amplitude modulating the second power portion of the downstream optical signal so as to obtain an upstream optical signal having a second amplitude modulation;
   propagating back along said optical line the upstream optical signal to the first optical line terminal;
   at said first optical line terminal, detecting said upstream optical signal;
   wherein the method further comprises the step of passive filtering said downstream optical signal and/or said second power portion of the downstream optical signal and/or said upstream optical signal, so as to lower, in absolute value, a respective non zero power difference of said two peaks.

2. The method of claim 1 wherein the step of passive filtering so as to lower, in absolute value, said respective non zero power difference lowers altogether said respective non zero power difference at an absolute value equal to or less than 0.5 dB, preferably equal to or less than 0.2 dB, more preferably equal to or less than 0.1 dB.

3. The method of claim 1, wherein the step of passive filtering so as to lower, in absolute value, said respective non zero power difference consists in passive filtering only said downstream optical signal and not said second power portion of the downstream optical signal nor said upstream optical signal and is performed before said step of propagating said downstream optical signal at a distance, said respective non zero power difference being said non zero power difference at generation.

4. The method of claim 1, wherein the step of passive filtering so as to lower, in absolute value, said respective non zero power difference is performed via a passive optical filter having a power spectral response tunable over wavelength, the above step comprising controlling the mutual position of the power spectral response of the passive optical filter and of said two peaks in the optical power spectrum of the respective optical signal under passive filtering.

5. The method of claim 4, wherein in the step of passive filtering so as to lower, in absolute value, said respective non zero power difference, said two peaks in the optical power spectrum of the relevant optical signal are aligned with a portion of the power spectral response of the passive optical filter having positive slope, when considering the spectra versus wavelength.

6. The method of claim 5, wherein said slope in said portion, when considering the power spectral response versus frequency, is, in absolute value, greater than or equal to about 0.1 dB/GHz and/or less than or equal to about 2 dB/GHz, preferably greater than or equal to about 0.2 dB/GHz and/or less than or equal to about 0.5 dB/GHz.

7. The method of claim 4, wherein the step of controlling the mutual position of the power spectral response of the passive optical filter and of said two peaks comprises tapping a power portion of the respective optical signal, in order to generate a monitor optical signal, and controlling said mutual position by controlling a physical parameter of the passive optical filter and/or of the laser source by way of a feedback signal generated in function of said monitor optical signal.

8. The method of claim 7, wherein said power portion of the respective optical signal is tapped after the respective optical signal has been filtered, and said feedback signal is generated so as to keep an amplitude modulation of the monitor optical signal at a substantially zero level.

9. The method of claim 7, wherein the monitor optical signal is detected in order to generate a corresponding electrical monitor signal, then an AC component of the electrical monitor signal is isolated and then processed, digitally or analogically, in order to generate the feedback signal depending upon said AC component, said feedback signal being generated in order to minimize said AC component.

10. The method of claim 4, wherein said passive optical filter is a Mach-Zehnder interferometer or a Fabry-Perot etalon or an arrayed waveguide grating.

11. The method of claim 1 wherein the step of amplitude modulating the second power portion of the downstream optical signal comprises the step of optically amplifying said second power portion by way of a semiconductor optical amplifier.

12. The method of claim 1 wherein in the step of passive filtering said downstream optical signal and/or said second power portion of the downstream optical signal and/or said upstream optical signal, the respective non zero power difference of the two peaks is at least halved altogether.

13. A method for WDM bidirectional optical communication comprising the method of claim 1, and the steps of:
   at said first optical line terminal, directly modulating a plurality of laser sources, including said laser source, each emitting a different optical wavelength, to generate a plurality of downstream optical signals, including said downstream optical signal, each having the same characteristics of said downstream optical signal;

spatially combining said plurality of downstream optical signals into a WDM downstream optical signal and propagating said WDM downstream optical signal at a distance along said first optical fiber of the optical line to the second optical line terminal;

at the second optical line terminal: spatially separating said plurality of downstream optical signals from said WDM downstream optical signal and processing each downstream optical signal in the same way as the said downstream optical signal and obtaining a plurality of upstream optical signals, including said upstream optical signal, each one having the same characteristics of said upstream optical signal; and spatially combining said plurality of upstream optical signals into a WDM upstream optical signal;

propagating back along said optical line the WDM upstream optical signal;

at said first optical line terminal, spatially separating said plurality of upstream optical signals from said WDM upstream optical signal and detecting each upstream optical signal.

14. The method of claim 13 wherein the step of passive filtering so as to lower, in absolute value, said respective non zero power difference is coincident with the step of spatially combining said plurality of downstream optical signals.

15. A bidirectional optical communication system comprising a first and a second optical line terminal at a mutual distance therebetween and an optical line comprising at least a first optical fiber optically connecting the first and second optical line terminal, the system being configured and/or programmed for performing the method of bidirectional optical communication of claim 1.

16. A second passive filter for use in a bidirectional optical communication system:
    wherein a first optical line terminal comprising a modulated laser source arranged to generate a downstream optical signal which has an optical power spectrum comprising two peaks having a frequency separation and a non zero power difference, and a detector configured to detect an upstream optical signal;
    wherein an optical line comprising at least a first optical fiber configured to propagate said downstream optical signal a distance along the optical line to a second optical line terminal;
    wherein a second optical line terminal comprising (i) a power splitter configured to power split said downstream optical signal to generate a first and second power portion of said downstream optical signal, spatially separated, (ii) a first passive filter configured to passively filter said first power portion of said downstream optical signal so as to increase in absolute value a respective power difference of said two peaks, so as to obtain a filtered optical signal which is thereafter detected, and (iii) an amplitude modulator configured to amplitude modulate the second power portion of the downstream optical signal so as to obtain the upstream optical signal having a second amplitude modulation, and to propagate the upstream optical signal back along said optical line to the first optical line terminal; and
    wherein the second passive filter is arranged to passively filter said downstream optical signal and/or said second power portion of the downstream optical signal and/or said upstream optical signal, so as to lower, in absolute value, a respective non zero power difference of said two peaks.

17. A bidirectional optical communication system comprising:
    a first optical line terminal comprising a modulated laser source arranged to generate a downstream optical signal which has an optical power spectrum comprising two peaks having a frequency separation and a non zero power difference, and a detector configured to detect an upstream optical signal;
    an optical line comprising at least a first optical fiber configured to propagate said downstream optical signal a distance along the optical line to a second optical line terminal;
    a second optical line terminal comprising (i) a power splitter configured to power split said downstream optical signal to generate a first and second power portion of said downstream optical signal, spatially separated, (ii) first passive filter configured to passively filter said first power portion of said downstream optical signal so as to increase in absolute value a respective power difference of said two peaks, so as to obtain a filtered optical signal which is thereafter detected, and (iii) an amplitude modulator configured to amplitude modulate the second power portion of the downstream optical signal so as to obtain the upstream optical signal having a second amplitude modulation, and to propagate the upstream optical signal back along said optical line to the first optical line terminal; and
    a second passive filter arranged to passively filter said downstream optical signal and/or said second power portion of the downstream optical signal and/or said upstream optical signal, so as to lower, in absolute value, a respective non zero power difference of said two peaks.

* * * * *

UNITED STATES PATENT AND TRADEMARK OFFICE
CERTIFICATE OF CORRECTION

PATENT NO. : 8,971,721 B2  
APPLICATION NO. : 13/320341  
DATED : March 3, 2015  
INVENTOR(S) : Mazzone et al.

Page 1 of 1

It is certified that error appears in the above-identified patent and that said Letters Patent is hereby corrected as shown below:

On the title page, item 56

On Page 2, under "OTHER PUBLICATIONS", in Column 2, Line 11, delete "IEE Stevenage," and insert -- IEEE Stevenage, --, therefor.

In the specification

In Column 10, Line 4, delete "receiver" and insert -- transmit --, therefor.

In Column 10, Line 10, delete "upstream transmitters 7 to send" and insert -- upstream receivers 7 to receive --, therefor.

In Column 10, Line 38, delete "demultipexer 16," and insert -- demultiplexer 16, --, therefor.

In Column 13, Line 38, delete "downstream receiver 10" and insert -- upstream transmitter 10 --, therefor.

In Column 13, Line 42, delete "downstream receiver 10" and insert -- upstream transmitter 10 --, therefor.

In Column 14, Line 20, delete "downstream transmitter 10" and insert -- upstream transmitter 10 --, therefor.

In Column 14, Lines 23-24, delete "downstream receiver 10" and insert -- upstream transmitter 10 --, therefor.

In Column 14, Line 36, delete "downstream transmitter 10" and insert -- upstream transmitter 10 --, therefor.

In Column 15, Line 65, delete "(e.g. FIG. 1)" and insert -- (e.g. FIG. 1). --, therefor.

Signed and Sealed this  
Twenty-third Day of February, 2016

Michelle K. Lee  
*Director of the United States Patent and Trademark Office*